May 31, 1966 K. ANTONSEN ETAL 3,253,995
ROD HANDLING EQUIPMENT FOR NUCLEAR REACTOR
Filed Sept. 17, 1963 10 Sheets-Sheet 9
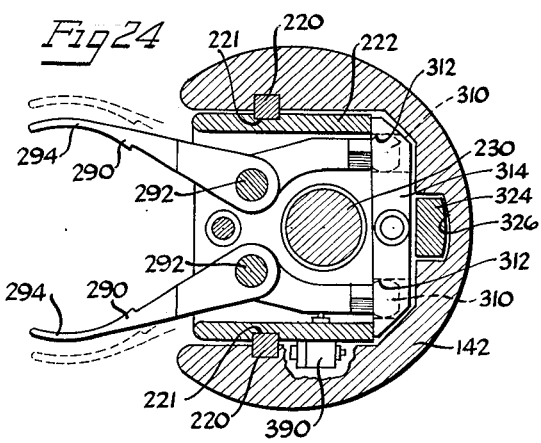
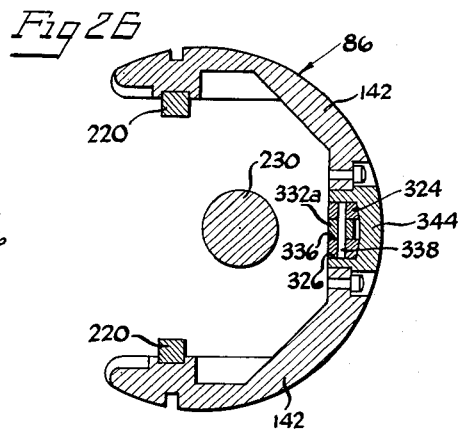
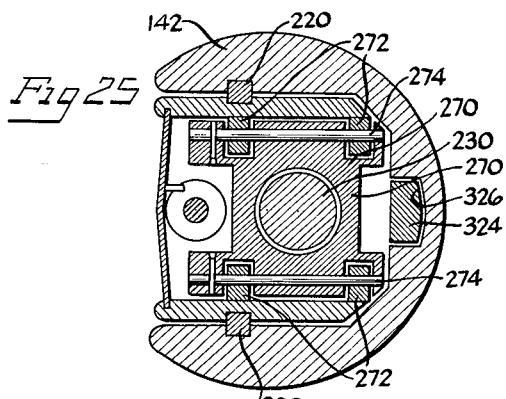
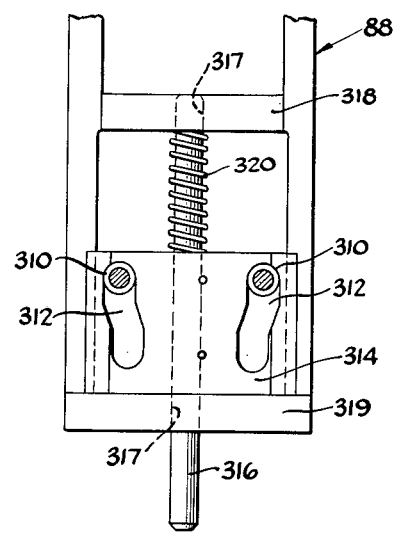
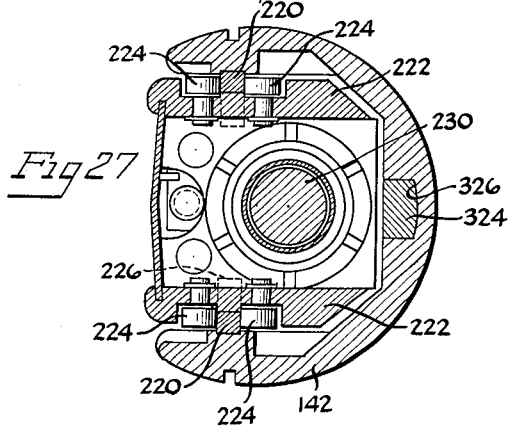
Inventors
KNUD ANTONSEN
FRANCIS R. BELL
ARTHUR M. HARRIS
RICHARD ROSENBERG
By Anderson, Luedeka, Fitch, Even & Tabin
Atty's

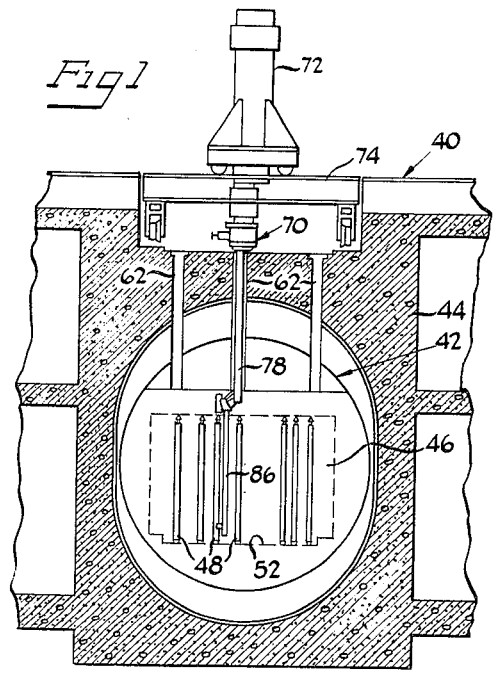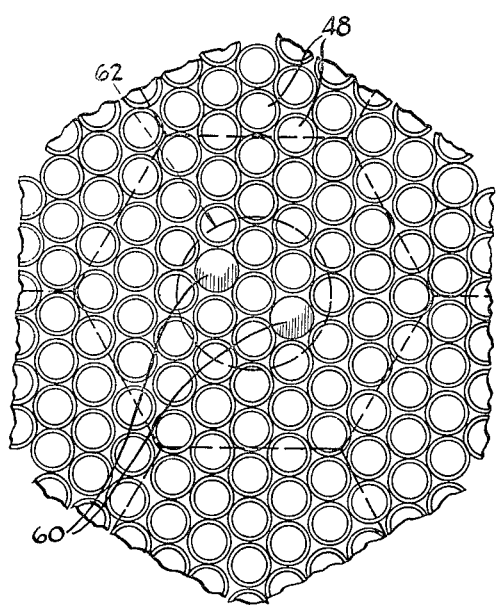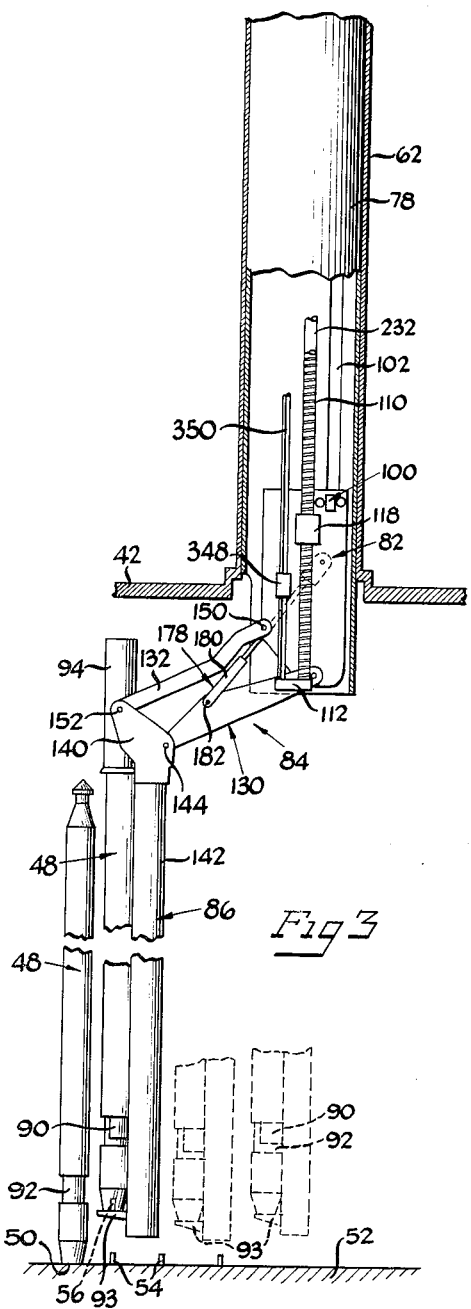

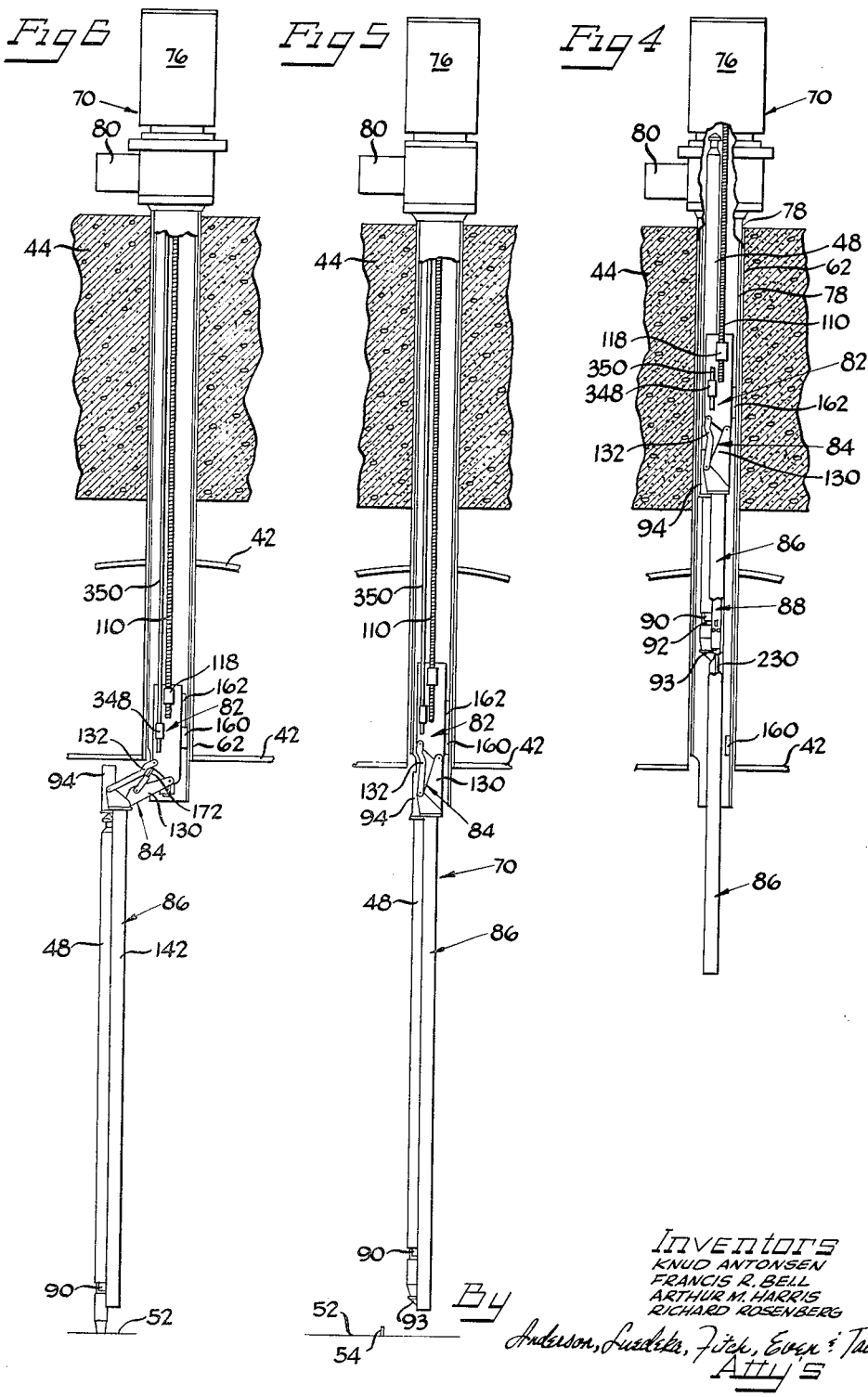

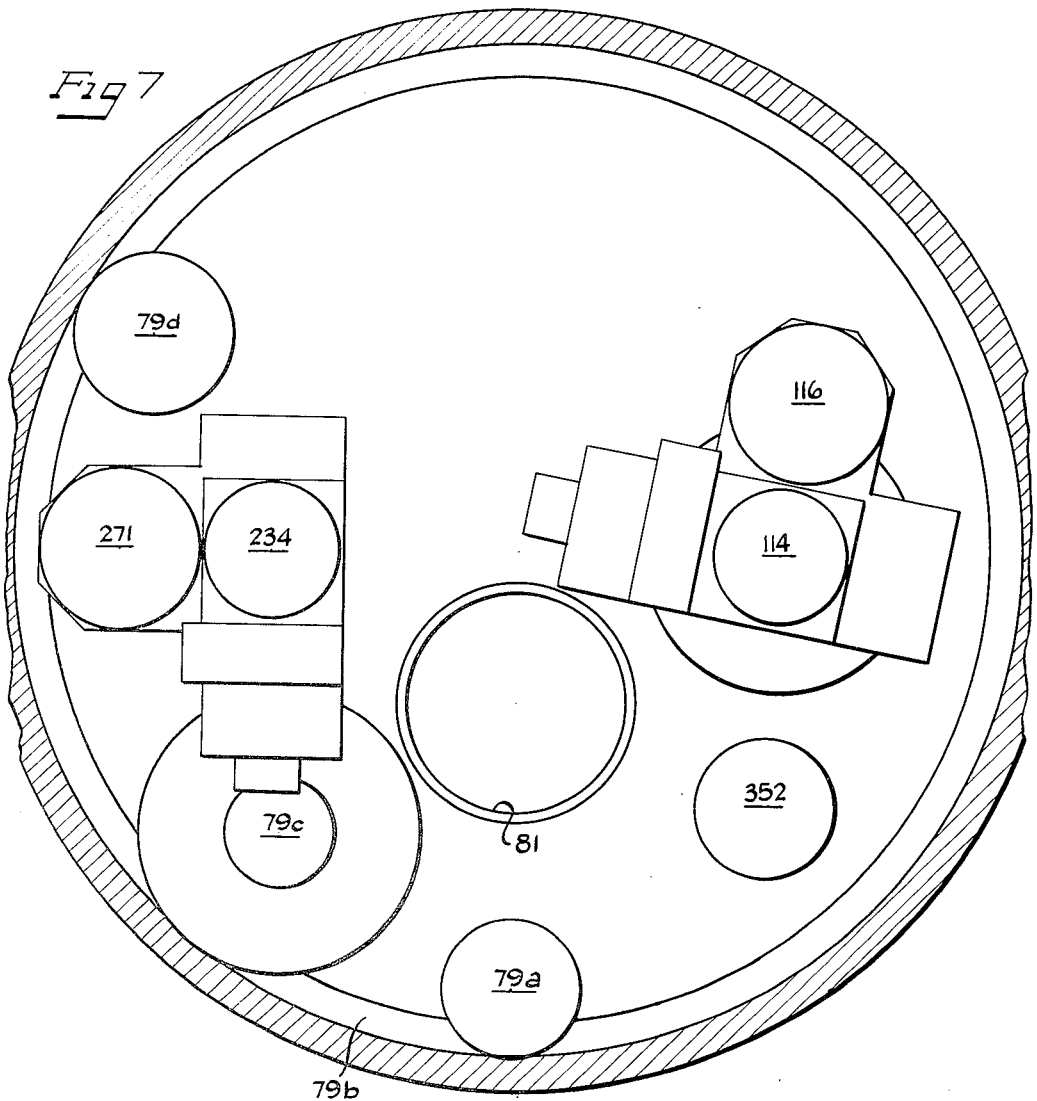

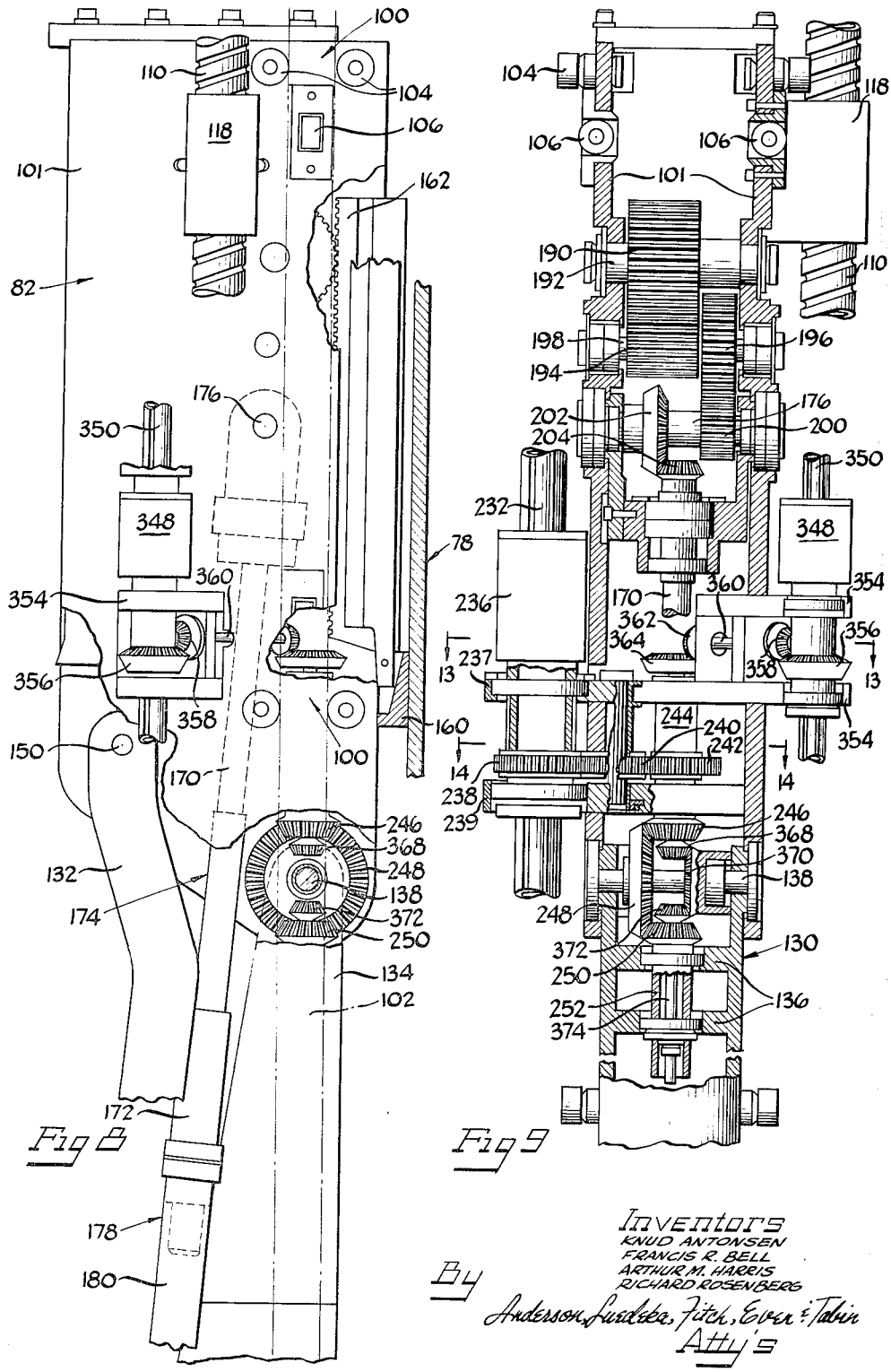

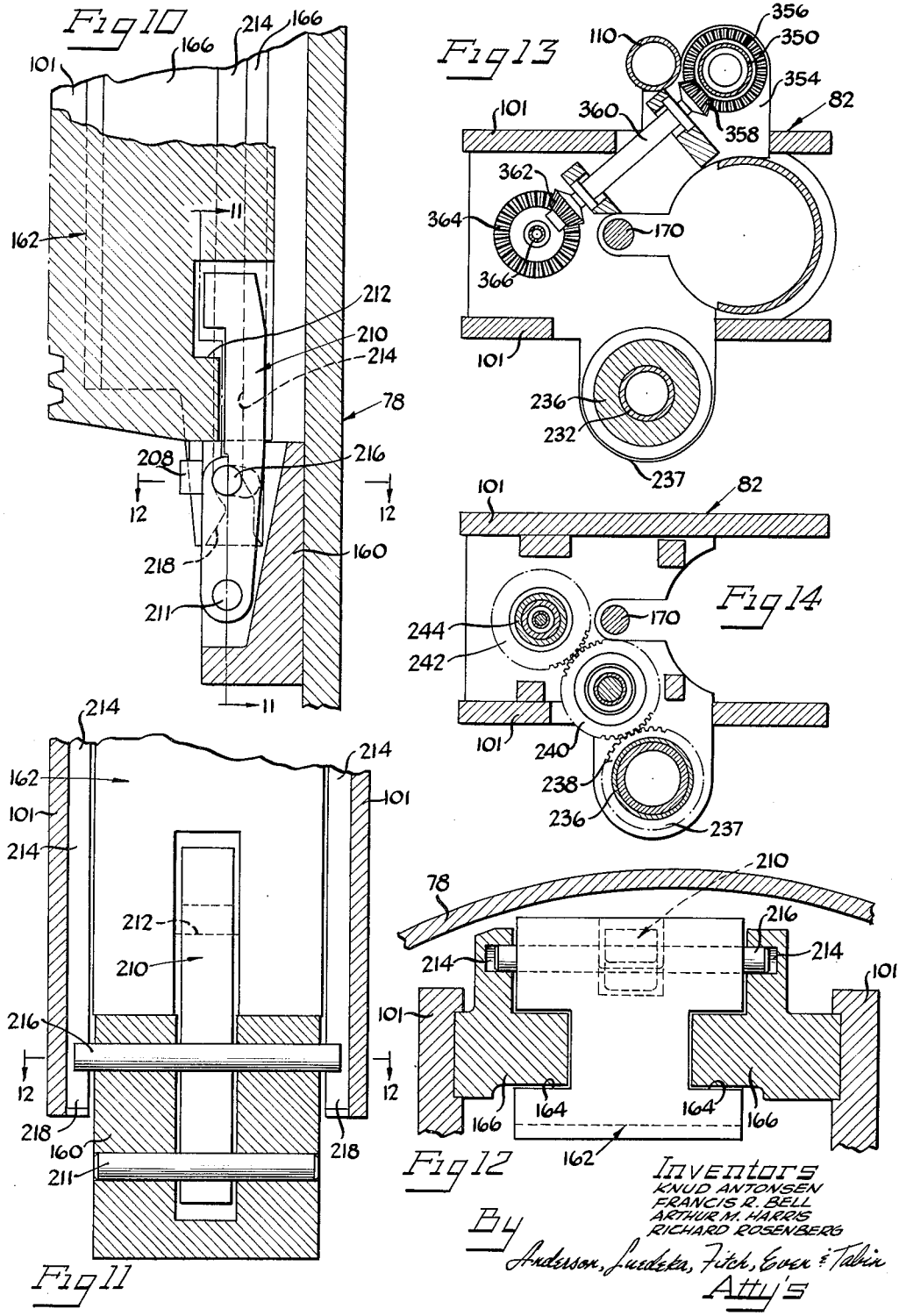

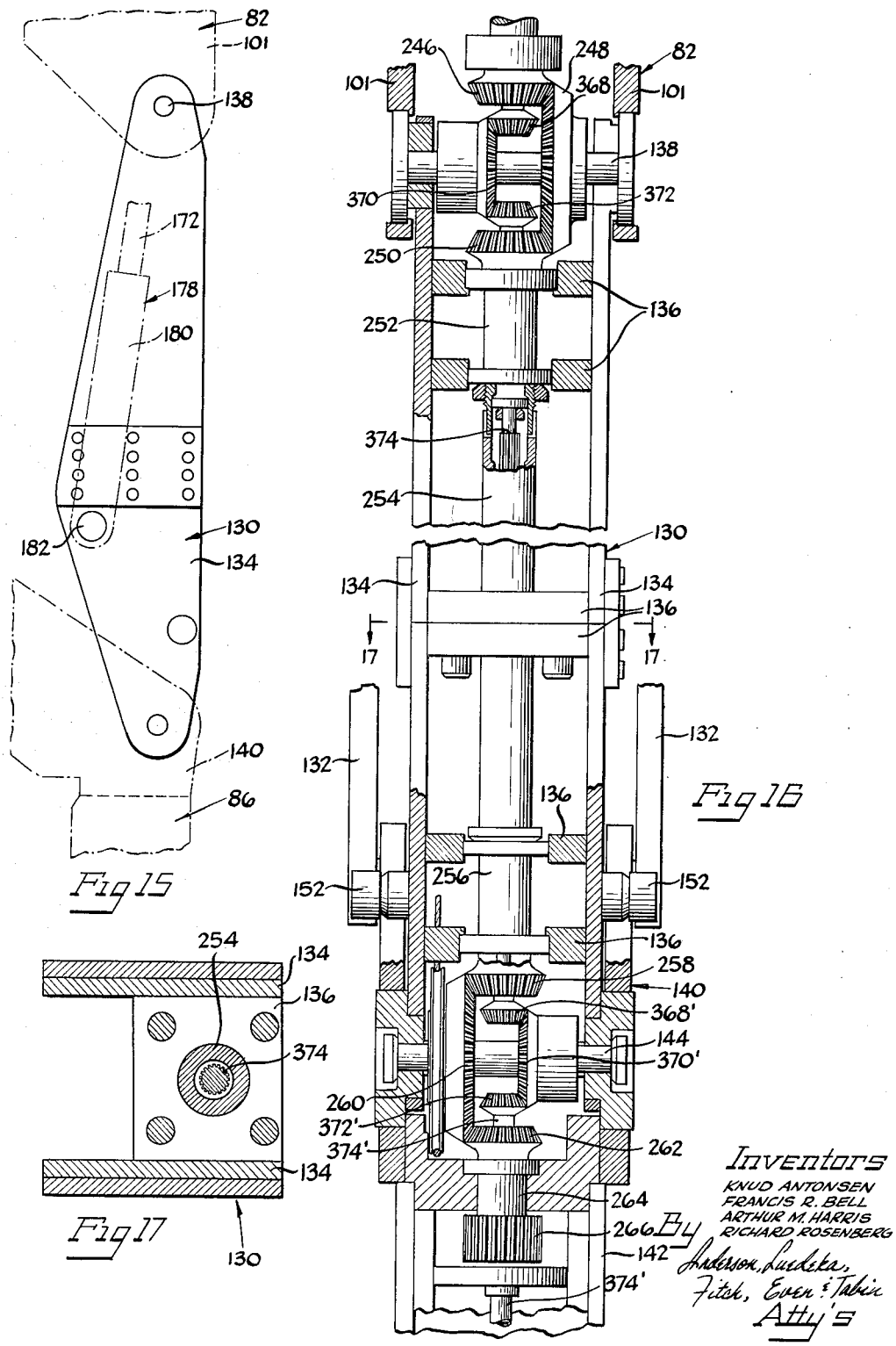

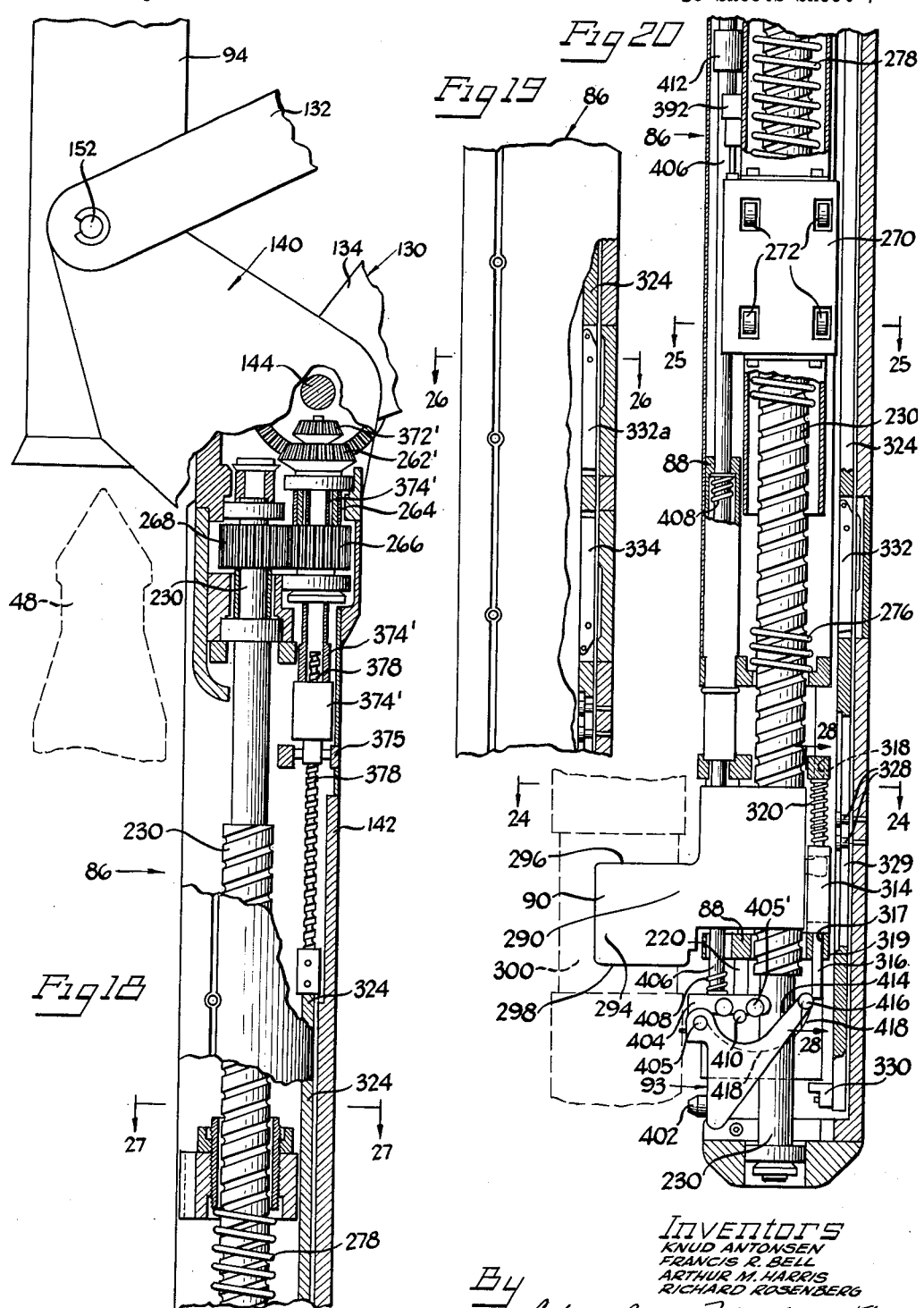

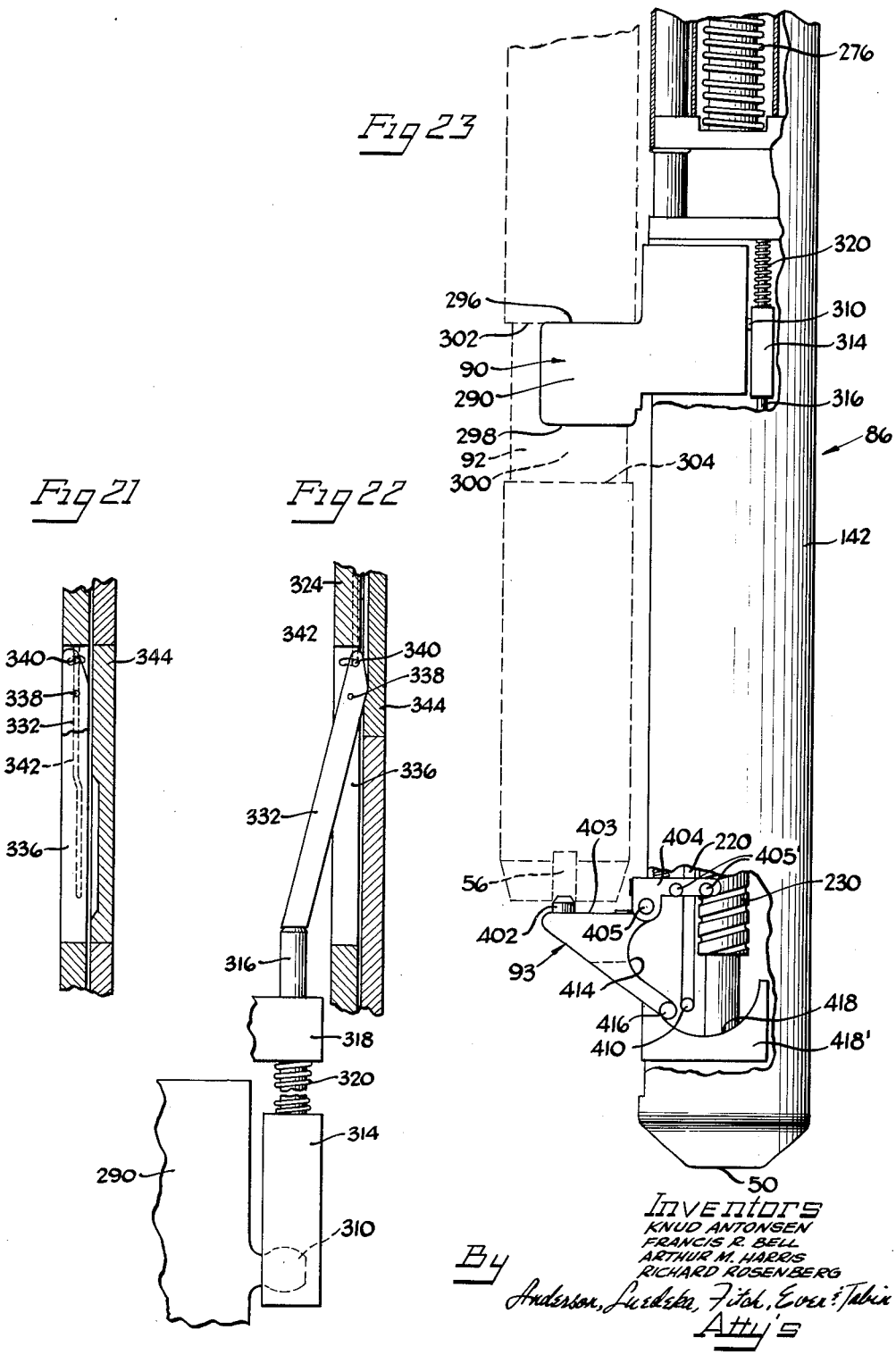

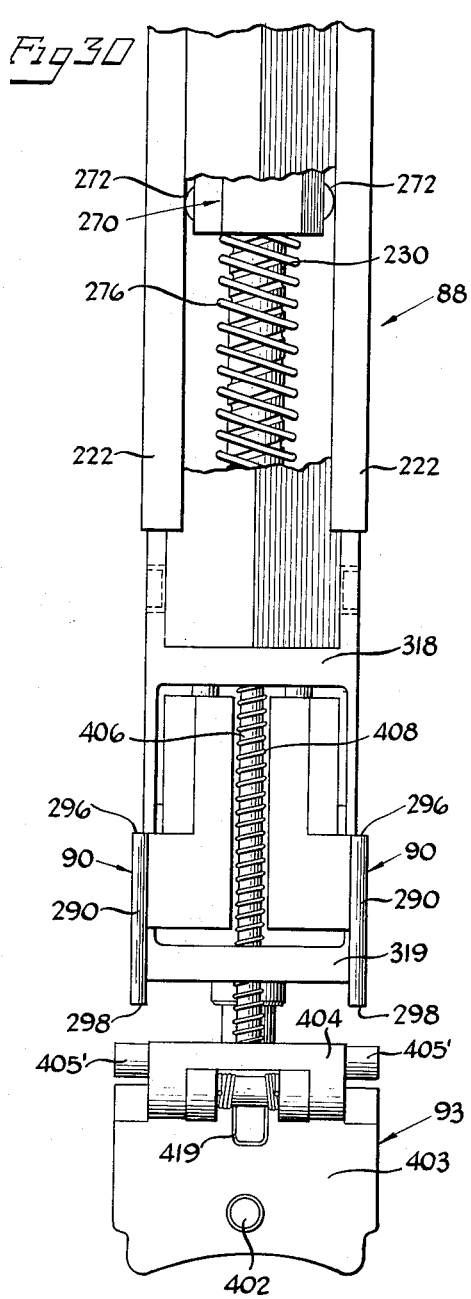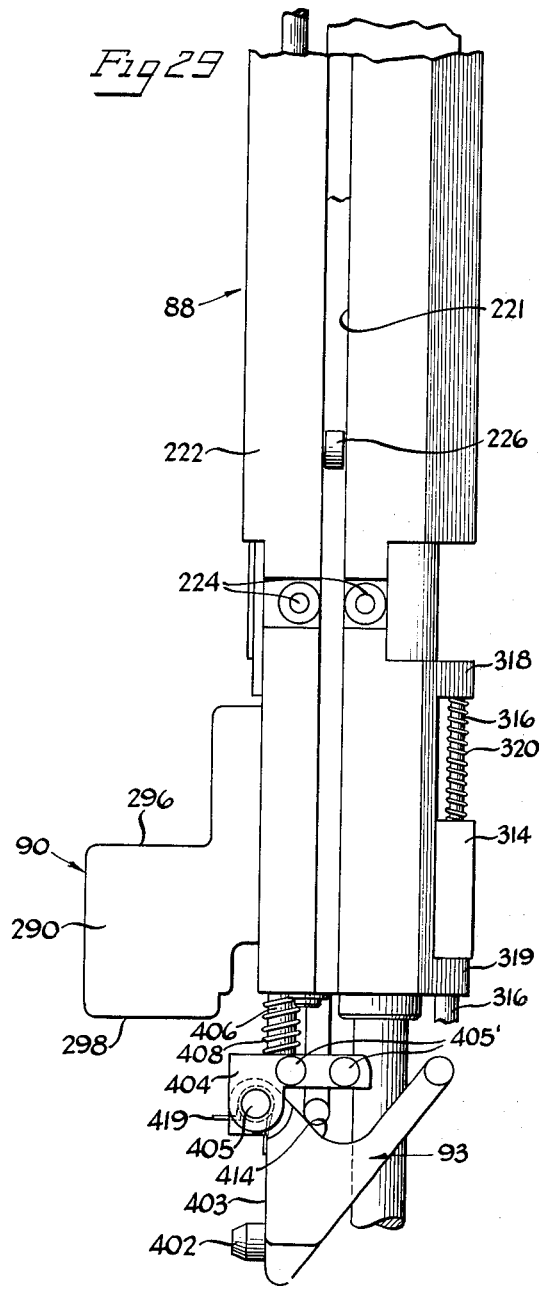

United States Patent Office 3,253,995
Patented May 31, 1966

3,253,995
ROD HANDLING EQUIPMENT FOR
NUCLEAR REACTOR
Knud Antonsen, San Diego, Francis R. Bell, La Jolla, and
Arthur M. Harris and Richard Rosenberg, San Diego,
Calif., assignors to General Dynamics Corporation,
New York, N.Y., a corporation of Delaware
Filed Sept. 17, 1963, Ser. No. 309,499
14 Claims. (Cl. 176—30)

This invention relates generally to nuclear reactors and, more particularly, to rod-handling equipment for moving axially vertical rod elements into and out of a reactor core.

Various types of nuclear reactors are known in the art and one general type of reactor has reactive fuel element rods and other associated rods vertically disposed in operative position within a pressure vessel containing a reactive core. It is common practice to retain vertical rod elements operatively positioned within the core by means of a grid plate which holds the upper ends of the rods. Many such reactors are provided with special refueling passageways extending upwardly directly above each rod or a group of several rods in the core. For refueling operations in a reactor of this type, many such passageways are required in addition to control rod access openings or nozzles. When the rods are being inserted into, or removed from the core, suitable rod-handling equipment in the form of refueling apparatus is usually operatively positioned in such refueling or access passageways opening into the core.

Some mechanisms have been designed for handling rods which are laterally displaced from the passageway when within the core. In these prior machines the upper end of the rod element must be grasped when loading or unloading the rod. Such practice has several disadvantages, such as requiring a great deal of head room above the rod elements to accommodate the movement of the rod handling mechanism and rod over the core, thus increasing the size and cost of the reactor. Since the top of the rod element is held by the refueling machine additional means must be provided to hold the rod element as it is shifted between the refueling machine and a suitable transfer cask hoist which also grasps the top of the rod. Furthermore, certain rod elements, such as reactive fuel elements, may be constructed of materials which are weak in tension so that damage to the fuel element may occur when its weight is supported from its top end.

Other nuclear reactors support and position vertical rod elements only at their lower ends, so that when the rod elements are operatively positioned, their bottom ends are fixedly located on seats at the bottom of the reactor core. Difficulty may be encountered in attempting to position bottom supported rod elements on the seats when the refueling machine grasps the rods only at their upper ends. This is particularly troublesome since the rods may warp slightly during use, and the handling mechanism may be unable to properly locate and engage the upper end of a bottom supported rod element when it is desired to remove the rod element. Still another difficulty encountered in handling a rod which is grasped only at its top end is that the rod may swing or sway if it is moved rapidly, and uncontrolled movement of a rod is undesirable for obvious reasons, particularly in that it may collide with other rods or parts of the reactor, or with the refueling machine.

Therefore, a primary object of this invention is to provide a new and useful rod-handling machine for a nuclear reactor. A related object is the provision of such a machine for more rapidly moving rod elements into and out of a reactor core.

A further object is the provision of a new and useful mechanism for holding a nuclear reactor rod element at points widely spaced along its length so that the rod may be safely moved at relatively high speed into or out of a reactive core.

A still further object is the provision of a new and useful machine for installing and removing vertical rod elements which are held at their bottom ends on fixed seats within a reactive core.

Another object is the provision of a new and useful apparatus which permits a substantial reduction in head room required for its operation in a reactor, thereby reducing the vertical dimensions of the reactor.

Still another object is the provision of a rod-handling machine for a nuclear reactor wherein the machine handles reactor rod elements so that the upper ends of the rod elements are free of the machine.

A further object is the provision of a new and useful nuclear reactor rod-handling machine for supporting a nuclear reactor rod element at its lower end so that the rod element is maintained in compression. A related object is the provision in such a refueling machine for also engaging the rod element at another point spaced above its lower end to retain the rod element steady as it is moved into or out of a reactor core. Another related object is the provision in such a machine for handling the rod element with its upper end free so that the upper end may be engaged by another mechanism as when delivering a rod element to the refueling machine or taking a rod element from the machine. Another related object is the provision of a rod-handling machine for insertion into a vertically disposed passageway above the core, already provided for other purposes normal to reactor operation. A still further object is the provision of such a machine for transporting rod elements through the machine with the upper ends of the rod elements free to be engaged by another mechanism.

These and other objects of the invention are more particularly set forth in the following detailed description and in the accompanying drawings of which:

FIGURE 1 is a fragmentary schematic side view of a nuclear reactor with a transfer cask operatively positioned above the pressure vessel of the reactor, with the rod-handling machine of this invention extending into a reactive core of the pressure vessel and engaging a rod element seated at its lower end in the core, with parts broken away for clearer illustration;

FIGURE 2 is a fragmentary enlarged plan view of a group of rod elements operatively positioned within the reactive core;

FIGURE 3 is a fragmentary enlarged elevational view of a portion of the machine shown in FIGURE 1, with parts broken away and removed for clearer illustration;

FIGURE 4 is a fragmentary enlarged elevational view of said machine holding a rod element in an uppermost position, with parts broken away and removed for clearer illustration;

FIGURE 5 is a view similar to FIGURE 4, but with the machine in an intermediate position suitable for moving the rod element vertically;

FIGURE 6 is a view similar to FIGURES 4 and 5 but with the machine within the core and in the position shown in FIGURE 1, with the rod element seated at the bottom of the core in its normal operative position;

FIGURE 7 is a diagrammatic enlarged plan view looking downwardly on the machine and showing the position of drive and indicator portions of the machine, with parts broken away for clearer illustration;

FIGURE 8 is a fragmentary enlarged side view of the main carriage of the machine in the position of FIGURE 5, with parts broken away for clearer illustration;

FIGURE 9 is a fragmentary front view of the main carriage shown in FIGURE 8, with parts broken away for clearer illustration;

FIGURE 10 is a fragmentary enlarged side elevational detail of a latch mechanism at a lower part of the main carriage, with parts broken away for clearer illustration;

FIGURE 11 is a fragmentary sectional view taken generally along the line 11—11 in FIGURE 10;

FIGURE 12 is a sectional view taken generally along the line 12—12 in FIGURE 10 or 11;

FIGURE 13 is a sectional view taken generally along the line 13—13 in FIGURE 9;

FIGURE 14 is a sectional view taken generally along the line 14—14 in FIGURE 9;

FIGURE 15 is an enlarged, fragmentary side view of a cross link in the position shown in FIGURE 5, with associated parts in phantom lines;

FIGURE 16 is a fragmentary enlarged front view of the cross link and associated mechanism with parts broken away for clearer illustration;

FIGURE 17 is an enlarged, sectional view taken generally along the line 17—17 in FIGURE 16;

FIGURES 18, 19, and 20 are fragmentary enlarged side views of the lower column or leg of the machine, in the position shown in FIGURES 1, 3 and 6, with parts broken away for clearer illustration, and more particularly:

FIGURE 18 is an upper portion of the leg and portions of the cross link mechanism, FIGURE 19 is an intermediate portion of the leg, and, FIGURE 20 is a lower portion of the leg including a grappler in position to support a rod element;

FIGURE 21 is a fragmentary enlarged detail of the leg showing the cam lever of a grappler jaw actuating mechanism, with the lever in an intermediate, normal position, and with parts broken away for clearer illustration;

FIGURE 22 is a view similar to FIGURE 21 but with the cam lever in an actuated position and engaging another part of the grappler jaw actuating mechanism;

FIGURE 23 is a side view of the lower portion of the leg, similar to FIGURE 20, but with portions of the leg including a safety platform in operative position below a rod element;

FIGURE 24 is an enlarged sectional view taken generally along the line 24—24 in FGURE 20;

FIGURE 25 is an enlarged sectional view taken along the line 25—25 in FIGURE 20;

FIGURE 26 is an enlarged sectional view taken generally along the line 26—26 in FIGURE 19;

FIGURE 27 is an enlarged sectional view taken generally along the line 27—27 in FIGURE 18;

FIGURE 28 is an enlarged sectional view taken generally along the line 28—28 in FIGURE 20;

FIGURE 29 is a side view of the lower portion of a grappler carriage removed from the leg; and FIGURE 30 is a fragmentary front view of the carriage portion shown in FIGURE 29.

The invention is, in general, directed to handling nuclear reactor rod elements, such as reactive fuel elements, reflector rods, dummy fuel elements, control rods, control rod guide tubes and the like, whether as individual rods or as bundles containing several rods. The rod element handling mechanism, sometimes called a refueling machine, is positioned to operate in an access opening or nozzle extending upwardly from the reactor core. The refueling machine is adapted to grasp and support a selected rod element at the lower end of the rod so as both to maintain the rod element in compression when the rod is being handled, thereby preventing damage to rod elements which may be weak in tension, and to reduce required head room above the core. At their lower ends the rod elements are supported on fixed seats which are positioned in the bottom of the core and permit only upward sliding movement of the rods. Removal of operatively installed elements and positioning of new elements in the reactor core is thus facilitated. Furthermore, the upper end of the rod element remains free to be engaged by other handling means. When operatively positioned in an access opening the refueling machine may be operated to load and unload numerous rod elements forming a group positioned within the core and laterally displaced from the access opening. While being moved, the rod elements are also restrained at their upper ends so that they are securely retained from displacement even when moved at relatively high speed, thus expediting the refueling operation.

THE NUCLEAR REACTOR

Referring to FIGURE 1 of the drawings, a nuclear reactor 40 includes a pressure vessel 42 surrounded by suitable nuclear shielding material such as concrete 44. The pressure vessel 42 contains a reactive core 46 in which rod elements 48, such as reactive fuel elements, dummy fuel elements, reflector rod elements, control rods, control rod guide tubes and the like, are operatively positioned in axially vertical position. With reference to FIGURE 3, each rod element 48 has its bottom end 50 seated on a platform 52 of the core and slidably engaged with a part extending upwardly from the platform 52. In the present instance said platform is equipped with a fixed axially vertical dowel pin 54 extending upwardly into an axially vertical socket 56 in the bottom of the rod. The socket 56 and the dowel 54 on which the socket 56 snugly slides are long enuogh to hold the rod in a sufficiently vertical position to cooperate with the rod-handling devices later described.

Hexagonal groups of rods 48 are positioned in the core generally as shown in FIGURE 2, and one or more, in this case two, control rods 60 are provided for each group of fuel rod elements. Each pair of control rods 60 is below a passageway in the form of an access opening or nozzle 62 which contains a removable actuating mechanism for raising and lowering the control rods as required.

THE ROD-HANDLING MACHINE
In general

When is it desired to replace a group of rod elements 48 as indicated by the dotted hexagon in FIGURE 2, the control rods and control rod guide tubes and related mechanism are first removed by drawing them upwardly by a suitable means such as a hoist through the associated vertically aligned passageway 62 which provides direct vertical access to the upper ends of the control rods. Then those fuel elements 48 which are directly under the passageway 62, are removed in a similar manner.

After the rods under the access passageway 62 have been removed, the refueling machine 70 is operatively positioned in the access opening 62 and a transfer cask 72 is moved, as on a tracked bridge 74, into proper orientation to co-operate with said refueling machine 70.

With particular reference to FIGURES 4–6, the refueling machine 70 includes a head portion 76 adapted in this case to a reactor isolation valve or shielding shutter 80, which is secured to the reactor access passageway 62. Mounted for rotation on, and depending from the head 76, is a hollow main column 78 which is inserted into the access opening 62. The head 76 includes means (FIGURE 7) in the form of an azimuth drive motor 79a operated from a remote control center (not shown) and drivingly coupled with a ring gear 79b fixed to a stationary portion of the head 76 for rotating the main column 78 in azimuth. A brake 79c is coupled with the ring gear to hold the main column in desired azimuth position and an azimuth indicator device 79d, in the present case a selsyn motor, is also coupled to the ring gear and suitably connected with the remote control center for indicating the azimuth position of the main column. With the main column properly positioned in azimuth, a rod element may be moved vertically, by means of the transfer cask hoist, through a port 81 (FIGURE 7) and a passageway within the main column 78 to or from the rod element position shown in FIGURE 4.

With particular reference to FIGURE 4, a main carriage 82 is mounted for vertical longitudinal movement within the main column 78 and carries a depending cross link mechanism 84 on which is mounted a vertically disposed rigid lower column or leg 86. Mounted for vertical longitudinal movement within the leg 86 is a grappler carriage 88 including a grappler 90 which is received in a circumferential peripheral groove 92 at the bottom end of the rod 48, thereby supporting the weight of the rod and holding it against horizontal movement. A safety platform or shelf 93 is adapted to swing out from the lower end of the leg 86 to a position immediately below the rod 48 for supporting the rod should it drop from the grappler 90. The leg 86 carries a vertically disposed sleeve 94 positioned above the grappler 90 and this sleeve telescopically receives the rod 48 so that the rod is retained against any appreciable horizontal movement relative to the leg.

To remove rods not directly under the access passageway 62, the grappler carriage 88 is moved downwardly along the leg 86 from the position shown in FIGURE 4 to the fully down position shown by the grappler 90 in FIGURE 6. The main carriage 82 may be moved downwardly in the main column 78 (from the position in FIGURE 4) thus carrying the cross link mechanism 84 and the leg 86 downwardly to an intermediate position as shown in FIGURE 5. As the main carriage 82 then continues its downward movement, the cross link mechanism 84 is caused to swing transversely of the main column carrying the leg 86 to the position shown in FIGURE 6. The approximately horizontal motion of the leg 86 causes the grappler 90 to be positioned in the rod groove 92 whereupon the grappler carriage 88 is moved upwardly to unseat the bottom end of the rod from the stand-off pin or dowel 54 and to slide the upper end of the rod element into the sleeve 94. The leg 86 and rod 48 are then moved into alignment with the main column 78 by means of upward motion of main carriage 82 and consequent motion of the cross link mechanism 84. The leg 86 and rod 48 are telescoped upwardly within the main column to the position shown in FIGURE 4 so that the top end of the rod element 48 is free to be grasped by the transfer cask hoist and, upon opening of the grappler 90, the rod element 48 may be hoisted into the transfer cask 72.

Upon inserting a rod, the operating cycle previously described is reversed. While the main carriage 82 moves downwardly, the grappler carriage 88 may be moved downwardly along the leg 86 from the position shown in FIGURE 4 to the position shown by the grappler 90 in FIGURE 5. After the leg 86 has been moved horizontally to the position shown in FIGURE 6, the grappler carriage 88 may be moved downwardly to engage the bottom end of the rod 48 with the dowel pin 54. The final downward movement of the grappler carriage slides the upper end of the rod element 48 out of the sleeve 94, and seats the rod on the platform 52. The grappler 90 may then be actuated to release the rod element which is now in its operative position in the core. The grappler 90 may be opened and closed only when in its extreme positions as shown in FIGURES 4 and 6. The main carriage 82 may now be moved upwardly in the main column 78 to move the leg 86 sideways from the position shown in FIGURE 6 back to the intermediate position shown in FIGURE 5 from which position the main carriage may be telescoped upwardly to move the leg 86 back into the main column 78, or the main column may be rotated in azimuth and the leg 86 again moved horizontally upon lowering the main carriage to engage another rod 48 for removing the rod.

The refueling machine 70 may also be used to transfer rod elements 48 from positions within the core 46 to other positions in the core after several rod elements 48 have been removed from the core by above mentioned procedures.

*Main carriage mounting and drive*

With particular reference to FIGURES 8 and 9, the main carriage 82 is mounted for vertical movement longitudinally within the main column 78 by means of groups of rollers 100 (FIGURE 8) mounted on upper and lower ends of opposite side walls 101 of the carriage 82. The groups of rollers 100 engage longitudinally extending rails 102 (shown in phantom lines in FIGURE 8) fixed to and extending longitudinally and inwardly along opposite sides of the main column. More particularly, each group of rollers 100 includes a pair of opposed rollers 104 which engage opposite side edges of the respective rail 102 and a third roller 106 transverse to the rollers 104 and engaging an inner face of the rail, thus restraining the main carriage 82 against horizontal and rotary movement with respect to the main column 78.

Means for moving the main carriage 82 vertically within the main column 78 is provided by a threaded shaft 110 (FIGURES 3–6 and 9) extending longitudinally within the main column 78 and journaled at its lower end in a journal block 112 forming part of the main column, and journaled at its upper end at the top of the main column where it is drivingly connected with an elevating motor 114 (FIGURE 7). Operation of this motor is suitably controlled from the remote control center and the location of the main carriage 82 longitudinally of the main column may be determined by a suitable indicator at the remote control center. This indicator is operated by a carriage-position-indicating selsyn motor 116 coupled with the main carriage shaft 110 and responsive to the number of revolutions made by the shaft for operating the indicator. The main carriage shaft 110 is threadedly engaged with an elevating nut 118 firmly secured to and extending outwardly from the right hand side wall 101. Thus, upon operation of the motor 114 in one direction the shaft 110 is rotated so as to lower the main carriage 82 and upon reverse operation of the motor to raise said main carriage.

Other parts of the main carriage will be described in conjunction with other parts of the refueling machine.

*The cross link mechanism*

The leg 86 is connected with the carriage 82 by means of the cross link mechanism 84 (FIGURES 3 and 15–18). Herein the cross link mechanism 84 is in the form of a parallel arm linkage between the leg 86 and main carriage 82 and includes a cross link 130 forming a lower link of the parallel arm linkage and horizontally opposed parallel arms 132 forming the upper link of the parallel arm linkage. With reference to FIGURES 15–17, the cross link 130 includes a pair of parallel side plates 134 spaced apart and rigidly connected with each other by suitable spacers, as 136. An upper end of the cross link 130 is pivoted to the lower end of the main carriage 82 by means of a shaft 138 extending through the cross link side plates 134 and the main carriage side walls 101 with the cross link side plates sandwiched between the main carriage side walls (FIGURES 8 and 9). The lower ends of the cross link side plates 134 are sandwiched between opposite legs of a U-shaped bracket 140 (FIGURES 16 and 18) fixedly secured to the upper end of an elongated vertically disposed rigid channel 142 of the leg 86. The plates 134 are pivoted to the bracket legs by means of a shaft 144. Upper ends of the arms 132 embrace the carriage side walls 101 and are pivotally secured thereto by means of a shaft 150 extending through the arms and main carriage side walls. The lower ends of the arms 132 embrace the legs of the U-shaped bracket 140 and are pivoted thereto by opposed pins 152 extending outwardly from the legs of the bracket 140, one through each bracket leg and adjacent arm 132. The sleeve 94 is rigidly mounted between the legs of the bracket 140.

Actuation of the cross link mechanism

The cross link mechanism 84 maintains the leg 86 vertical and swings the leg horizontally from a position in vertical alignment with the main column 78 to a position laterally displaced from the main column as shown in FIGURES 1, 3 and 6, responsive to movement of the main carriage 82 vertically of a predetermined fixed station along the main column 78. Herein this station is defined by an abutment bracket 160 fixedly mounted on the inside of the column 78 near its lower end, as may best be seen in FIGURES 8 and 10. During loading of a rod element 48 into the core, the main carriage 82 is moved downwardly through the main column 78, as previously described, and during such movement the lower end of a rack 162 abuts the abutment bracket 160. The rack 162 is mounted on the main carriage 82 for sliding movement in a vertical direction. With reference to FIGURE 12, the rack 162 has a pair of opposite outwardly opening channels 164, one receiving each of a pair of vertical rails 166 fixedly secured to adjacent main carriage side walls 101. When the rack seat against the abutment bracket 160, continued downward movement of the main carriage 82 past the now stationary rack 162 actuates a gear train (FIGURES 8 and 9) of the main carriage to rotate a shaft 170. This shaft is threadedly engaged in a non-rotating threaded sleeve 172 on the cross link and therewith forms an actuating link 174, the overall length of which changes as the shaft 170 is rotated. The shaft 170 forms an upper end of this link and is pivoted to the main carriage 82 by means of a shaft 176 journaled at opposite ends in the main carriage side walls 101. The sleeve 172 forms a lower end of the link and is pivoted to the cross link 130 by means of a bifurcated lower end 178 (FIGURE 15) of the sleeve, the end 178 having arms 180 embracing opposite faces of the cross link side plates 134 and pivoted thereto by means of a pair of pins 182 fixedly secured to the side plates 134 and journaled in the arms 180, thus holding the threaded sleeve 172 against rotation relative to the axis of the sleeve. As the actuating link 174 is shortened the cross link is caused to move from the position shown in FIGURE 5 toward the position shown in FIGURE 6.

With reference to FIGURE 9, the gear train between the rack 162 and the threaded shaft 170 is in the form of a first gear 190 mounted on a shaft 192 seated in the opposite main carriage side walls 101. The first gear 190 is drivingly meshed with the rack 162. This gear is also drivingly meshed with a second gear 194 keyed to a shaft 198 journaled in the opposed side walls 101 and forming a cluster with a third gear 196 also keyed to said shaft 198. The cluster gear 196 is drivingly meshed with a pinion 200 fixed on the shaft 176 on which is also fixed a bevel gear 202. It should be noted that the shaft 176 pivotally connects the upper end of the actuating link 174 to the carriage 82. The bevel gear 202 is drivingly meshed with a bevel pinion 204 fixedly mounted on the upper end of the threaded shaft 170. Therefore, as the main carriage 82 moves downwardly relative to the rack 162 which is seated on the abutment bracket 160, the rack drives the gear 190 which acts through the remainder of the gear train to rotate the bevel pinion 204 for rotating the shaft 170 and causing the actuating link 174 to become shorter thereby moving the cross link mechanism and the leg 86 horizontally and out of alignment with the main column 78.

The distance which the leg 86 is moved horizontally away from the main column 78 is determined by the distance the main carriage 82 moves downwardly after the rack 162 is seated on the abutment bracket 160, and thus the horizontally displaced position of the leg may be determined at the remote control center through operation of the carriage position indicating mechanism. More particularly, a switch 208 (FIGURE 10) is fixed on the main column 78 in position to be operated as the rack 162 abuts the abutment bracket 160, and this switch is connected for providing a suitable signal at the remote control center. Thereafter, the distance moved by the main carriage 82 after the signal, as sensed by the carriage-position-indicating selsyn motor 116, may be interpreted to indicate the distance the leg 86 has moved sideways.

In order to positively hold the rack 162 against upward movement along with the returning main carriage 82, a latch mechanism is provided as can best be seen in FIGURES 10–12. This latch mechanism includes an upright keeper 210 received in a slot in the abutment bracket 160 and pivoted thereto at its lower end by means of a pivot pin 211 extending through the bracket and keeper. An offset detent at the upper end of the keeper may be latchingly engaged in a notch 212 in the rack 162. Prior to the rack engaging the abutment bracket 160, the keeper 210 is free of the rack, and as the main carriage 82 moves downwardly, opposed generally vertical slots 214 in the rails 166 receive opposite ends of a pin 216 fixed in the keeper 210 and extending outwardly therefrom through opposed elongated slots in the abutment bracket 160. The bottom ends of the vertical slots 214 have flared mouths, as at 218 (FIGURE 10), to guide the ends of the pin 216 into the respective slots. The vertical slots are shaped to cam the keeper 210 counterclockwise (as viewed in FIGURE 10) and into the notch 212 in the rack 162. Continued downward movement of the main carriage 82 causes the ends of the pin 216 to ride through vertical portions of the respective slots 214 until downward movement of the main carriage stops responsive to operation of the remote control mechanism. Upon movement of the main carriage 82 upwardly in the main column 78, the keeper 210 supplements the weight of the rack 162 in effectively preventing upward movement of the rack along with the main carriage, so that the gear train which operates the actuating link 174 causes the actuating link to expand, and the leg 86 is, therefore, moved back into vertical alignment with the main column. After the leg 86 is in alignment with the main column, the pins 216 are cammed by surfaces 218 by motion of the carriage 82 to release the keeper from the notch 212 in the rack 162 and the pins then leave the slots 214 as the rack moves upwardly with the remainder of the main carriage 82.

In summary, the leg 86 may be moved horizontally, as out of alignment with the main column 78, varying distances as controlled by the distance the main carriage 82 continues to move downwardly after the travel of the rack 162 has been stopped by its engagement with the abutment bracket 160.

Grappler carriage

With particular reference to FIGURES 4–6, as the leg 86 moves downwardly from the position shown in FIGURE 4 to the position shown in FIGURE 5, the grappler 90 may be moved downwardly longitudinally along the leg between the positions shown in these figures. The grappler is mounted on the grappler carriage 88, as may best be seen in FIGURES 20, 29 and 30. Mounting of the grappler carriage 88 for vertical movement longitudinally of the leg 86 is provided by a pair of opposed rails 220 (FIGURES 24–27) fixedly seated in notches in the inner face of the leg channel 142. The rails 220 are freely received in outwardly facing notches 221

(FIGURE 24) in opposed side walls 222 of a body portion of the carriage 88. Opposite sides of each rail are snugly embraced by pairs of opposed rollers 224 journaled in and extending outwardly from the side walls 222, with one such pair being shown on either side of the grappler carriage in FIGURE 27. The pairs of rollers 224 are suitably spaced vertically along each side of the grappler carriage to firmly mount this carriage against movement from front to rear of the leg 86. Rollers 226 (shown in phantom lines in FIGURE 27) are also journaled in the grappler carriage side walls 222 and are transverse to the pairs of rollers 224 for engaging opposed inner faces of the rails 220. The rollers 226 are spaced vertically along each side wall 222 to hold the grappler carriage 88 against movement sideways relative to the leg 86. Thus, the grappler carriage 88 is firmly mounted for vertical sliding movement longitudinally of the leg channel 142.

*Actuation of the grappler carriage*

Means for moving the grappler carriage 88 longitudinally of the leg 86 is provided by a vertical threaded grappler-carriage-elevating shaft 230 (FIGURES 18-20) journaled at the top and bottom of the leg channel 142. The shaft 230 is driven, through a suitable gear train to be described hereinafter, by a grappler carriage spline shaft 232 (FIGURE 9) extending longitudinally through the main column 78 and journaled at its upper end on the top of the main column and drivingly coupled with a grappler carriage elevating motor 234 (FIGURE 7). The grappler spline shaft 232 is journaled at its lower end in a block (not shown) similar to the journal block 112, but mounted on the opposed side of the main column 78. The spline shaft 232 is slidingly engaged with a vertically disposed co-operating spline sleeve 236 (FIGURES 9, 13, 14) journaled in suitable bearings mounted on flanges 237 extending outwardly from the left hand main carriage side wall 101.

With reference to FIGURES 8, 9, 13, 14, 16 and 18, the sleeve 236 is integral with a driving gear 238 of the aforementioned gear train, and this gear is coupled through an idler gear 240 with an intermediate gear 242 integral with a sleeve 244. The sleeve 244 is journaled in suitable cross members which rigidly connect the side walls 101 of the main carriage. A bevel gear 246 is integral with the lower end of the sleeve 244 and is drivingly meshed with a bevel idler gear 248 journaled for free rotation on the shaft 138 and drivingly meshed with bevel gear 250 which is integral with a sleeve 252 suitably journaled in the cross members 136 which rigidly connect the opposite side plates 134 of the cross link 130. It should be noted that the bevel gears 246, 248 and 250 are so related to the pivot shaft 138 connecting the main carriage 82 with cross link 130 that these gears remain drivingly meshed as the cross link pivots with respect to the main carriage. The lower end of the sleeve 252 (FIGURE 16) is fixedly coupled with an end of an elongated tube 254 extending through the cross link 130 and the tube 254 is coupled at an opposite end with a sleeve 256 journaled in the cross members 136 of the cross link. To the lower end of the sleeve 256 there is keyed a second driven bevel gear 258 which is drivingly meshed with an intermediate bevel gear 260 mounted on the shaft 144 which pivotally connects the lower end of the cross link 130 with the bracket 140. The intermediate bevel gear 260 is drivingly meshed with a driven beveled gear 262 integral with a sleeve 264 journaled in the bight portion of the U-shaped bracket 140 on the top of the leg channel 142. As previously mentioned with reference to the gearing relationship at the pivot shaft 138, the bevel gears 258, 260 and 262 remain drivingly meshed as the cross link 130 pivots about the shaft 144. A gear 266 (FIGURES 16 and 18) is integral with the lower end of the sleeve 264 and is drivingly meshed with a driven gear 268 fixedly mounted on the upper end of the grappler carriage threaded shaft 230. The shaft 230 is threadedly engaged with a nut 270 (FIGURES 20, 25 and 30). The nut is suitably coupled with the grappler carriage 88 for moving this carriage longitudinally of the leg 86. The position of the nut 270, and, therefore, the general position of the grappler 90 longitudinally of the leg 86 may be determined at the remote control center by a suitable indicator responsive to a grappler indicating device 271 (FIGURE 7) in the head 76. The indicating device 271 is coupled to the grappler operating motor 234 for indicating its revolutions.

With reference to FIGURE 20, the nut 270 has vertically spaced pairs of rollers 272, each pair journaled on the nut by respective shafts 274. These rollers engage inner faces of the opposed walls 222 of the grappler carriage thereby enabling the nut 270 to float vertically on the shaft 230 between a pair of heavy co-axial spaced spiral compression springs. The lower compression spring 276 has its lower end seated on a cross member of the grappler carriage and its upper end seated on a lower face of the nut 270. The upper spring 278 of the pair has its upper end seated on a cross member of the grappler carriage and its lower end seated on a top face of the nut 270. Thus, for a purpose which will become apparent hereinafter, before the grappler carriage 88 can be lifted, the upper spring 278 must be compressed by upward movement of the nut 270 to compensate for the weight of the load including the grappler assembly and a rod 48, if any, carried thereby. Similarly, lower spring 276 must be compressed by downward movement of the nut 270 in order to apply downward force to a rod 48 if required.

To summarize the operation of the grappler carriage elevation drive, the grappler carriage motor 234 is operated in either direction from the remote control center, and upon operation in one direction moves the nut 270 upwardly thereby compressing the upper spiral compression spring 278 and then moving the grappler carriage 88 upwardly. Upon reverse operation of the grappler carriage motor, the nut 270 is lowered so as to lower the grappler carriage 88.

*The grappler*

The grappler 90 is mounted on the grappler carriage 88, as may best be seen in FIGURES 20, 23, 24 and 28-30.

The grappler 90 includes a pair of opposed jaws 290 individually pivoted to the grappler carriage 88, one by each of a pair of vertical pins 292 (see FIGURE 24) extending through the respective jaw 290 and seated in vertically opposed cross members of the body of the grappler carriage. The outer ends 294 of these jaws are curved to provide opposed concavities and have generally horizontal upper edges 296 and lower edges 298 (see FIGURE 29). When the outer ends 294 of the jaws are received in the groove 92 and the jaws are closed, the concave portions of the jaws loosely embrace the cylindrical neck portion 300 within the groove 92 (see FIGURE 23) and effectively prevent any appreciable horizontal movement of the lower portion of the rod element 48, without the jaws being tightly clamped around the rod element. The upper edges 296 of the grappler jaws can be moved upwardly into firm seated engagement with an upper horziontal annular surface 302 of the groove 92 so that the grappler 90 may support the weight of the rod 48 in moving the rod in the core 46 and through the passageway in the main column 78. The lower edges 298 of the jaws are adapted to be firmly seated against a lower horizontal annular surface 304 of the groove 92 upon downward movement of the jaws so that the rod may be positively pushed down into engagement with its seat in the core 46 and so that the bottom end face of the rod 48 is seated on the bottom surface 52 of the core and the dowel or stand-off pin 54 is fully received in the socket 56 in the lower end of the rod 48 (FIGURE 3).

Actuation of the grappler

In order to open and close the grappler jaws 290, each inner end thereof is provided with cam followers in the form of knobs 310, one knob extending rearwardly from the inner end of the respective jaw and received in each of a pair of generally upright cam slots 312 (FIGURES 24 and 28) in a vertical cam plate 314. The cam plate 314 is mounted for vertical movement on the body of the grappler carriage 88 and, more particularly, the cam plate 314 is fixed to a vertical actuator pin 316 extending above and below the cam plate. The pin 316 is mounted for vertical sliding movement by means of its opopsite end portions being received in vertically aligned holes 317 extending through an upper cross member 318 and a lower cross member 319 of the body of grappler carriage 88, as may best be seen in FIGURES 20 and 28-30. The cam slots 312 have intermediate portions which diverge upwardly and connect upper and lower portions and the cam slots are so shaped as to co-operate with the knobs 310 of the grappler jaws 290 to move the jaws to closed position (FIGURE 24) when the cam plate is moved to its lower position (FIGURES 28-30). When the cam plate 314 is moved to its upper position the grappler jaw knobs 310 are cammed toward each other so that the outer ends 294 of the grappler jaws move to their open position shown in dotted lines in FIGURE 24.

A spring 320 is provided to insure that the grappler jaws 290 remain closed, unless positively opened by motion of rod 324 as described hereinafter. The spiral compression spring 320 is located about the upper end portion of the rod 316 and is seated at its upper end on the upper cross member 318 and at its lower end against an upper end face of the cam plate 314 to thus urge the cam plate to its lowermost position for closing the grappler jaws.

As may best be seen in FIGURES 18-26, means for opening and closing the grappler jaws is provided in a jaw operating rod 324 extending longitudinally of the leg channel 142 and freely received in a vertical slot 326 opening through the inner face of the rear of the leg channel. The rod 324 is secured in the slot 326 for vertical sliding movement by means of a plurality of headed set screws 328 extending through vertical slots 329 in the rod and threadedly seated in the rear portion of the leg channel 142. The lower end of the rod 324 carries an abutment block 330 positioned to engage the bottom end face of the cam plate rod 316.

With the grappler 90 in its lower position as shown in FIGURES 1, 3, 6 and 19, upon upward movement of the cam actuating rod 324 the cam plate is moved upwardly by the abutment block 330, thereby opening the grappler jaws 290. Upon downward movement of the grappler jaw operating rod 324 a cam lever 332 near the lower end of the rod 324 is cammed outwardly to engage the upper end face of the cam plate rod 316 and upon continued downward movement of the cam actuating rod 324 the cam plate is positively moved to its lowermost position as shown in FIGURE 28, thereby closing the grappler jaws 290. When the grappler jaws are in their elevated position, as shown in FIGURE 4, they may be opened and closed by similar cam levers including an upper cam lever 332a which, in structure and in operation, is identical to the previously described cam lever 332 and co-operates with a third cam lever 334 positioned slightly below the cam lever 332a and mounted to be cammed outwardly upon upward movement of the jaw operating rod 324, for engaging the lower end face of the cam plate rod 316 and moving it upwardly to open the grappler jaws so that a rod element 48 may be removed from the refueling machine or inserted therein by means of the hoist of the transfer cask 72 (see FIGURE 1).

The cam levers 332, 332a and 334 are all received in vertical slots, as 336, in the rod 324 and are pivotally mounted in the respective slot each by means of a horizontal pivot pin 338 seated in the jaw operating rod 324 on opposite sides of the respective slot 336 and extending through the respective cam lever. Each cam lever carries a fixedly mounted horizontal cam pin 340 which extends through arcuate slots in the operating rod 324 on opposite sides of the respective slot 336 with the outer ends of each cam pin each slidably received in elongated generally vertical and parallel cam slots 342 in opposite side faces of the slot 326. The cam levers 332 and 332a are pivoted at their upper ends, each with its cam pin 340 above its pivot pin 338, and the cam lever 334 is pivoted at its lower end with its cam pin below its pivot pin and its cam slots 342 inverted from those of cam levers 332 and 332a. The cam slots for each cam lever are formed in an insert block 344 secured in a complementary opening in the rear of the leg channel 142. Each insert 344 has a slot which extends about opposite side edges of the rod 324 and forms part of the vertical slot 326, as may best be seen in FIGURE 26.

When the grappler carriage 88 is moving longitudinally of the leg channel 142, the grappler actuating rod 324 is an intermediate position so that all cam levers are nested in their respective slots 336 (FIGURE 21, for example), and the rod abutment block 330 is spaced below the lower end of the cam plate rod 316 thus avoiding any interference between the various parts.

Means for moving the grappler operating rod 324 longitudinally of the leg 86 between its normal intermediate position as shown in FIGURE 20, for example, and its elevated grappler opening position and depressed grappler closing position, is provided through a suitable gear train upon rotation of a jaw operating spline 350 (FIGURES 8 and 9) extending longitudinally through the main column 78 and journaled at its upper end on an upper portion of the main column and at its lower end in the journal block 112 (FIGURE 3). The upper end of the jaw operating spline 350 is suitably drivingly coupled with a jaw operating motor 352 (FIGURE 7). The jaw operating spline 350 is slidingly engaged with a spline sleeve 348 journaled in flanges 354 extending outwardly from the right side wall 101 of the main carriage 82. The sleeve 348 is integral with a driving bevel gear 356 of the gear train and this gear is drivingly meshed with a driven bevel gear 358 on an end of a shaft 360 (FIGURE 13) suitably journaled in the body of the main carriage 82. The end of the shaft 360 opposite the driven bevel gear 358 carries a second bevel gear 362 which is drivingly meshed with a larger bevel gear 364 integral with a small shaft 366 journaled in the sleeve 244. At its lower end the shaft 366 carries another bevel gear 368 (FIGURES 9 and 16). The last mentioned bevel gear 368 is drivingly meshed with an idler bevel gear 370 freely journaled on the shaft 138 which pivotally connects the cross link 130 with the main carriage 82. The idler bevel gear 370 is drivingly meshed with a lower bevel gear 372 so that these gears remain drivingly engaged upon pivoted movement of the cross link 130 with respect to the main carriage 82, in a manner similar to that of previously described gear trains. The lower bevel gear 372 is fixed on an inner shaft 374 journaled in the sleeve 252. The lower end of the shaft 374 carries a bevel gear 368' connected through a bevel idler gear 370' mounted on pivot shaft 144, with a driven bevel gear 372' mounted on an inner sleeve 374' which extends through the sleeve 264. The lower end of the inner sleeve 374' threadedly receives a threaded vertical shaft 378 secured to the upper end of the rod 324 so that upon rotation of the sleeve 374' the rod 324 is raised or lowered depending upon the direction of operation of the jaw operating motor 352 as controlled from the remote control center.

Suitable sensing means, such as an electric switch 390 (FIGURE 24) may be provided on the grappler carriage 88 to engage one of the grappler jaws 290 and is suitably connected with the remote control center for indicating whether the jaws are open or closed. A sensing means, here in the form of a transducer 392 (FIGURE 20), may be mounted on the body of the grappler carriage 88 for engaging the nut 270 as the nut 270 is elevated relative to the grappler carriage 88 due to compression of spring 278. The transducer 392 indicates to the remote control center the nut 270 travels upwardly relative to carriage 88 before the rod element 48 is lifted, which is also the amount of compression of spring 278. This indication enables the vertical load at the grapple jaws 290 to be deduced.

To summarize the operation of the grappler 90, the grappler jaw operating motor 352 may be operated in either of two opposite directions for rotating the grappler spline shaft 350 in opposite directions and thereby either raising or lowering the grappler operating rod 324 from its intermediate position as shown in FIGURES 18–20. Upon lowering the grappler actuating rod 324 the cam levers 332 and 332a are cammed outwardly so that the lever adjacent the upper end face of the cam plate rod 316 may engage this rod upon continued downward movement of the grappler actuating rod 324 for positively closing the grappler jaws 290. Upon operation of the grappler operating motor 352 in the opposite direction, the rod 324 is moved upwardly to its intermediate position. Upward movement of the rod 324 from its intermediate position cams the cam lever 334 outwardly to engage the bottom end face of the cam plate rod 316 when the grappler 90 is in its upper position as shown in FIGURE 4, or when in its lower position, so as to move the abutment block 330 upwardly into engagement with the lower end face of the cam plate rod 316, thereby opening the grappler jaws 290. As mentioned previously, when the grappler carriage 88 is moving along the leg channel 142, the grappler actuating rod 324 and its cam levers and abutment block are in the intermediate rod position as shown in FIGURES 19 and 20, to avoid interference with the grappler carriage.

With reference to FIGURE 3, it should be noted that when the grappler 90 is in its lowermost position on the leg 86, as the leg and grappler are moved transversely within the core to engage a rod element 48, they move in a path deviating slightly from horizontal and the elevation of the grappler 90 will vary depending on the distance which the leg is moved transversely from its position of normal alignment with the main column 78. While this difference in elevation is slight, the grooves 92 in the rods 48 are of sufficient height that the grappler jaws 290 may be moved into the groove and be closed about the rod element 48. Subsequent upward movement of the grappler causes its upper edges 296 to seat against the top edge 302 of the groove. Upon installing a rod, downward movement of the grappler causes its lower edges 298 to seat against the lower groove edge 304, thereby positively moving the rod onto its seat at the bottom of the core. Indication of the downward force applied is deduced by the compression of spring 276 in a manner similar to that described with reference to spring 278.

*Safety shelf*

In order to prevent a rod element 48 from falling from the leg 86 in the event that the rod element becomes free of the grappler 90, the safety platform 93 (FIGURES 3–5, 20, 23, 29 and 30) is moved from a normal retracted position (FIGURES 20, 29 and 30) to an operative extended position (FIGURES 3–5 and 23) below the bottom end of the fuel element 48. When the platform is in the operative extended position, a retaining pin or stud 402 extends upwardly from a platform base 403 and is received in the socket 56 in the bottom end of the rod 48, to aid in holding the rod element against lateral movement relative to the leg 86. As the rod 48 is lifted upwardly off its seat on the bottom of the core, the shelf 93, which is mounted on the grappler carriage 88 swings outwardly from its normal retracted position into its extended operative position under, but not engaging, the bottom end face of a rod element 48. Upon reverse operation, after the leg 86 has reached the lower end of its downward travel and as the grappler carriage 88 continues to move downwardly to seat the bottom end of a rod element 48 on a pin 54, the shelf 93 swings into the bottom portion of the leg 86 and out the path of the rod element 48.

With particular reference to FIGURES 20, 23, 29 and 30, the safety shelf 93 is pivotally mounted on a carrier 404 by means of a pivot pin 405, for swinging movement about a horizontal axis. The carrier 404 is mounted by means of pairs of opposed rollers 405' on either side of the carrier and these rollers embrace the adjacent vertical rails 220 of the leg channel. The carrier 404 is secured on the bottom end of a vertical supporting rod 406 which is suitably mounted in portions of the body of the grappler carriage 88 for vertical sliding movement. A spiral compression spring 408 is located about the rod 406 and is seated at its upper end on the portion of the body of the grappler carriage 88 through which the rod 406 passes, and is seated at its bottom end on a top face of the carrier 404, thus urging the carrier downwardly and into seated engagement with a pair of rollers 410 journaled on the leg channel 142, one at the lower end of each of the rails 220.

As the grappler carriage 88 is initially moved upwardly, the spring 408 expands to retain the carrier 404 in the position as shown in FIGURE 20. Continued upward movement of the grappler carriage 88 causes the portion of its body which seats the upper end of the spring 408 to engage an abutment 412 (see top of FIGURE 20). The abutment 412 is tightly frictionally clamped about an upper portion of the rod 406 so that the abutment 412 and the rod 406 move upwardly along with the grappler carriage 88 to cause the carrier 404 to move upwardly. Upward movement of the grappler carrier swings the shelf 93 outwardly with cam surfaces 414 on either side of the shelf moving up to engage and ride across the rollers 410, and opposed rollers 416 on the shelf move downwardly as they ride across upwardly facing concave cam surfaces 418 on plates 418' fixed along either side of the leg channel 142 to cam the shelf from the normal retracted position as shown in FIGURE 20 to its operative extended position as shown in FIGURE 23. As the shelf 93 moves to the extended position its rollers 416 are cammed to a position in front of and below the rollers 410 and the front edges of the adjacent rails 220 fixed along the inner face on either side of the leg channel 142, as previously described. A torsion spring 419 encircles the pivot pin 405 and has opposite ends seated on the shelf 93 and the carrier 404 to urge the rollers 416 counterclockwise and, therefore, against the front faces of the rails 220 upon upward movement of the grappler carriage 88.

Thus, should a rod element become free of the grappler 90, the rod element will drop but a short distance onto the safety shelf 93 and the shock of such a fall will be absorbed by sliding of the rod 406 downwardly through the abutment 412 which is firmly seated on the body of the grappler carriage 88. The socket 56 in the bottom of the rod element 48 will fully receive the upright stud 402 of the shelf 93 thus retaining the rod element under control.

When the grappler carriage 88 returns to its lowermost position, gravity and the torsion spring 419 cause the rollers 416 to ride back on the cam surface 418 to retract the safety shelf.

OPERATION

The control rods 60 along with their guides and operating mechanism are first removed through the nozzle 62 in any suitable manner. Any rods 48 directly below this nozzle are then removed by a hoist lifting these rods from their seats straight up through the nozzle passageway into the transfer cask 72. After the transfer cask 72 is out of the way, the refueling machine 70 is operatively positioned in the nozzle passageway 62. The head 76 of the refueling machine is securely held, in any suitable manner, in indexed position on the top of the reactor. The transfer cask 72 is moved back into position and suitably coupled with the head 76 of the refueling machine. By operation from the remote control center, the azimuth motor 79a is actuated to position the main column 78 as desired so that the grappler 90 may engage one of the operatively positioned rod elements 48 which are horizontally displaced from the main column passageway. The main carriage motor 114 and the grappler carriage motor 234 may now be actuated from the remote control center to lower, respectively, the main carriage 82 and therewith the leg 86, and the grappler 90, so that the parts are positioned generally as indicated in FIGURE 5. Downward movement of the main carriage 82 continues and the bottom of the rack 162 (FIGURE 10) engages the abutment bracket 160 whereupon the cross link mechanism 84 is actuated to move the leg 86 horizontally away from the main column 78 a distance as determined by downward movement of the main carriage 82 after the rack 162 has engaged the abutment bracket 160. Such downward movement of the main carriage 82 is stopped from the remote control center when the leg 86 is in a desired position, for example, as shown in FIGURE 6. With the grappler 90 open it moves into the groove 92 at the bottom of the rod 48 to be removed from the reactive core 46. Upon actuation of the grappler operating motor 352 to move the actuator rod 324 downwardly from its open grappler position, the cam lever 332 swings outwardly and into engagement with the upper end of the cam plate rod 316 to move the grappler cam plate 314 downwardly, thereby closing the grappler 90 about the rod 48. The grappler operating motor 352 is then reversed to return the grappler actuating rod 324 to its normal intermediate position with all cam levers coextensive with the rod. Now, the grappler carriage motor 234 is actuated from the remote control center to raise the grappler carriage 88 whereupon the upper edges 296 of the grappler jaws 290 engage the upper annular edge 302 of the rod element 48. When the upper compression spring 278 has been compressed sufficiently by upward movement of the nut 270, the grappler carriage 88 will move upwardly lifting the rod element off its seat and out of engagement with the dowel pin 54. During such movement the safety shelf 93 swings to its extended position under the bottom end of the rod element 48 with the stud 402 in the mouth of the socket 56 in the bottom end face of the rod element. Such initial upward movement of the grappler carriage 88 moves the top end of the rod 48 upwardly into the sleeve 94 so that the rod element is securely held by the leg 86. With the rod element elevated slightly above the bottom 52 of the core, the main carriage 82 moves upwardly, responsive to operation of the main carriage motor 114, thus actuating the cross link mechanism 84 to move the leg 86 and the rod 48 carried thereby into vertical alignment with the main column 78. The grappler carriage motor 234 is actuated to move the grappler carriage 88 upwardly along the leg 86 while the leg is being raised into the main column 78 by upward movement of the main carriage 82 within the main column. When the refueling machine is again in the position as shown in FIGURE 4, the hoist from the transfer cask 72 may be lowered to engage the free upper end of the rod 48. When the hoist is supporting the rod element, the grappler 90 may be opened by operation of the grappler operating motor 352 to cam the lever 334 outwardly and upwardly to engage the bottom end of the grappler actuating rod and raise the cam plate 314, thereby opening the grappler jaws so that the rod element may be removed by the hoist.

When inserting a rod element into the core the above described cycle is reversed.

While this invention has been described with particular reference to certain structure and operation in a particular environment, various changes may be apparent to one skilled in the art, and the invention is, therefore, not to be limited to such structure, operation or environment. Various of the features of the invention are set forth in the following claims.

What is claimed is:

1. For use in a nuclear reactor having a reactive core and a passageway extending generally vertically above the reactor core, said core including a rod element extending generally vertically within the core and spaced horizontally from the passageway when the rod is in its working position,
   a means for facilitating movement of the rod upwardly through said passageway, which comprises, in combination,
   (a) a leg,
   (b) means for lowering the leg through the passageway into the core and alongside the rod, and
   (c) means on said leg for guiding and supporting a lower portion of said rod.

2. For use in a nuclear reactor having a reactive core which includes a rod element extending generally vertically within the core,
   a means for facilitating movement of the rod, which comprises, in combination,
   (a) first means for engaging a lower portion of the rod and effectively holding the rod against relative horizontal and vertical movement over its entire length, whereby the rod is in compression rather than tension and the upper end of the rod is free to be grasped by other means,
   (b) and means for moving said first means in a predetermined path while effectively preventing free movement of said first means, whereby the rod is under positive control throughout movement thereof.

3. For use in a top-loading nuclear reactor having a reactive core which includes a rod element extending generally vertically within the core and a passageway extending generally vertically above the reactor core and offset horizontally from the rod when the latter is in its working position.
   a means for facilitating movement of the rod upwardly through said passageway, which comprises, in combination,
   (a) a vertically extending rigid leg adapted to be lowered into the core through the passageway, and
   (b) means carried by said leg for guiding said rod intermediate the ends of said rod.

4. For use in a top-loading nuclear reactor having a reactive core and a passageway extending generally vertically above the reactor core, the core including a reactive rod element extending generally vertically within the core and offset from the passageway when the rod is in its working position,
   a means for facilitating the movement of the rod upwardly through said passageway, which comprises, in combination,
   (a) means including a member for guiding a lower portion of said rod, said member being vertically insertable in said core through said passageway, and
   (b) means operable at will for horizontally shifting said member within the core so as to move the rod axis to a position under the passageway.

5. For use in a top-loading nuclear reactor having a reactive core which includes a rod element extending generally vertically within the core and a passageway extending generally vertically above the reactor core and offset horizontally from the rod when the latter is in its working position, a means for facilitating movement of the rod upwardly through said passageway, which comprises, in combination,
 (a) a vertically extending leg adapted to be lowered into the core through the passageway,
 (b) means carried by said leg for guiding said rod intermediate the ends of said rod, and
 (c) means for horizontally shifting the leg at will after the leg has been lowered into the core so as to move the guiding means toward the rod.

6. For use in a top-loading nuclear reactor having a reactive core which includes a rod element extending generally vertically within the core and a passageway extending generally vertically above the reactor core and offset horizontally from the rod when the latter is in its working position,
 and a means for facilitating movement of said rod generally vertically through said passageway, which comprises, in combination,
 (a) a rigid generally vertically extending member,
 (b) means for moving said member into and out of the core through the passageway, and
 (c) means carried by said member for guiding said rod intermediate the ends of said rod during movement of the rod into and out of the core.

7. For use in a top-loading nuclear reactor having a reactive core which includes a group of rod elements extending generally vertically within the core and a passageway extending generally vertically above the reactor core and offset horizontally from the rods when the latter are in their working positions,
 a means for facilitating the removal of the rods upwardly through said passageway, which comprises, in combination,
 (a) a vertically extending leg adapted to be positioned alongside any selected one of said rods,
 (b) means for moving said leg into and out of the core through the passageway,
 (c) means carried by said leg for guiding the selected one of said rods intermediate the ends thereof, and
 (d) means for horizontally shifting the leg at will after the leg has been lowered into the core so as to move the guiding means toward the selected rod.

8. For use in a nuclear reactor having a reactive core which includes a fixed seat and an upright rod element having a lower end portion engaged with said seat in the working position of the rod,
 a rod-handling means, which comprises, in combination,
 (a) rod engaging means selectively operable for releasably holding the lower end of the rod against relative vertical or horizontal movement over its entire length,
 (b) control means selectively operating said rod engaging means for so holding the lower end of the rod and moving the rod engaging means vertically to seat or unseat the rod, thereby bodily moving the rod with the weight of the rod supported at its lower end on said rod engaging means so that the rod is in compression.

9. For use in a nuclear reactor having a reactive core which includes a fixed seat and an upright rod element having a lower end portion engaged with said seat in the working position of the rod,
 and a rod-handling means, which comprises in combination,
 (a) rod engaging means selectively operable for releasably holding the lower end of the rod against relative vertical and horizontal movement and for engaging the rod above its lower end and effectively restraining the rod against free movement as by swinging,
 (b) control means selectively operating said rod engaging means for so holding and restraining the rod and bodily moving the rod engaging means to seat and unseat the rod with the weight of the rod supported at its lower end so that the rod is in compression rather than tension and the upper end of the rod is free to be engaged by other handling means.

10. For use in a nuclear reactor having a reactive core and a fuel element rod within the core,
 a means for facilitating movement of the rod, which comprises, in combination,
 (a) a rigid leg adapted to extend alongside the rod,
 (b) first means on said leg for engaging an end portion of the rod and effectively holding the rod against relative movement in a path extending axially of the rod and effectively holding the rod against relative movement transversely with respect to the leg,
 (c) second means on said leg for engaging a portion of said rod spaced longitudinally along the leg from said first means and effectively holding the rod against relative movement transversely with respect to the leg,
 (d) means for moving said first means longitudinally of the leg to move said rod along said leg, and
 (e) means for moving said leg in a predetermined path, whereby the rod is under positive control throughout movement thereof.

11. For use in a nuclear reactor having a rod element extending generally vertically within a reactive core, a handling means for moving the rod, which comprises, in combination,
 (a) an assembly including,
  (1) a leg adapted to be lowered into the core so as to extend alongside the rod,
  (2) first means on said leg for engaging a lower portion of the rod and effectively holding the rod against relative horizontal and vertical movement, and
  (3) second means on said leg for engaging a portion of the rod spaced above said first means and effectively holding the rod against relative horizontal movement, and
 (b) means for moving said assembly to move the rod.

12. For use in a nuclear reactor having a pressure vessel, a reactive core in said vessel and a generally vertical hollow access passageway opening into said reactor and extending above the reactor core, said core including a rod element extending generally vertically within the core and spaced horizontally from the passageway when the rod is in its working position, the lower end of said rod being anchored and supported in said vessel, a rod-handling means for facilitating movement of the rod upwardly through said passageway, which comprises, in combination,
 (a) a leg,
 (b) means for lowering the leg through the passageway into the core and alongside the rod,
 (c) a grapple on said leg for grasping and supporting a lower portion of said rod,
 (d) means for moving the grapple in one direction laterally to engage the said lower portion of said rod and for subsequently shifting the grapple in a different lateral direction so as to move the rod under the access passageway, and
 (e) means carried by the rod-handling means for raising said rod between said lateral movements.

13. In a nuclear reactor having a reactive core including a passageway having an end opening into the core and a group of rod elements operatively positioned generally parallel to the axis of the passageway and laterally displaced from the passageway different distances,
 a rod element handling mechanism for transferring rod elements into, out of and within the core, which comprises, in combination, (a) a carriage,
(b) means for mounting said carriage within said passageway for movement longitudinally of the passageway,
(c) holding means for releasably engaging and supporting any one of the rod elements,
(d) a cross link connecting said holding means and carriage for movement of said holding means between a position axially aligned with said passageway, for moving the rod element through the passageway, and other positions laterally displaced from said passageway for holding any one of the rod elements in operative position,
(e) carriage actuating means for moving said carriage longitudinally of said passageway and selectively varying the distance said carriage is positioned toward the core past a predetermined station near the end of the passageway opening into said core, thereby moving the rod element engaged by said holding means through the passageway, and
(f) cross link actuating means responsive to movement of said carriage outwardly past said station for moving said holding means laterally of the passageway axis and positioning said holding means to the side of the passageway selected distances proportionate to the distance said carriage is positioned past said station for engaging a selected one of the operatively positioned rod elements, whereby operation of said carriage actuating means to position the carriage also positions the holding means laterally of said passageway a desired distance.

14. In a top-loading nuclear reactor having operatively positioned rods extending upwardly from lower ends removably held on seats within a reactor core, and having an access passageway extending upwardly from the core, a handling mechanism for loading and unloading the rods through the passageway and upon loading a rod for operatively positioning rod upon a seat within the core, which comprises, in combination,
(a) a hollow column,
(b) means for removably and operatively mounting said column for rotation about an upright axis with the column generally vertical in said passageway,
(c) a vertical leg,
(d) means mounting said leg for movement with the rotating column and movement longitudinally and transversely of said column between a position alongside an operative position of a selected one of said rods and a position telescoped within said column,
(e) means for releasably holding a rod and including,
  (1) a generally vertically disposed sleeve on an upper portion of said leg for effectively holding the rod against horizontal movement,
  (2) a grapple operable for effectively holding the rod against relative horizontal and vertical movement, and
  (3) means mounting said grapple below said sleeve for movement with and longitudinally of said leg,
(f) means for rotating said column about said upright axis and holding said column in operative position for movement of said leg alongside an operative position of a selected one of said rods, and
(g) actuating means operable in reverse cycles for loading and unloading the rods and upon operation for unloading a selected one of said rods said grapple being at a lower end of said leg in position to grip the lower end of the selected rod, and said actuating means operating said grapple to hold the lower end of the selected rod, moving the grapple slightly upwardly to unseat the lower end of the selected rod and positioning the upper end of said rod in said sleeve, and moving said leg into alignment with and then upwardly into said column to move the selected rod through said sleeve toward the top of the main column, whereby the rod is under compression when held by said grapple and is securely held by said grapple and sleeve for rapid movement in the reactor, and when said leg is telescoped into said main column the rod is positioned with its upper end free to be engaged by other handling mechanism.

References Cited by the Examiner

UNITED STATES PATENTS

| | | | |
|---|---|---|---|
| 1,476,050 | 12/1923 | Buttress | 214—1 |
| 1,818,584 | 8/1931 | Schroeder | 214—658 |
| 2,706,658 | 4/1955 | Jewell | 214—658 |
| 2,949,202 | 8/1960 | Treshow | 176—30 X |
| 3,039,949 | 6/1962 | Newton et al. | 176—30 |

FOREIGN PATENTS 912,659  12/1962  Great Britain.

LEON D. ROSDOL, *Primary Examiner.*

REUBEN EPSTEIN, CARL D. QUARFORTH,
*Examiners.*

L. D. RUTLEDGE, *Assistant Examiner.*